United States Patent [19]

Fanta et al.

[11] Patent Number: 5,025,171
[45] Date of Patent: Jun. 18, 1991

[54] METHOD AND ARRANGEMENT FOR PROVIDING POWER OPERATION OF SWITCHGEAR APPARATUS

[75] Inventors: Thomas O. Fanta, Melrose Park; Leonard V. Chabala, Maywood, both of Ill.

[73] Assignee: S&C Electric Company, Chicago, Ill.

[21] Appl. No.: 411,274

[22] Filed: Sep. 22, 1989

[51] Int. Cl.$^5$ .............................................. H02B 1/04
[52] U.S. Cl. ..................................... 307/150; 200/18; 200/43.01; 361/335
[58] Field of Search ................ 307/143, 150; 336/334, 336/335, 341, 357, 390, 391, 427; 192/71; 74/625; 335/68, 74, 76; 200/43.01, 43.11, 43.16, 50 C, 321, 322, 329, 332, 335, 3.7, 501, 17 R, 18, 148 F; 361/331, 334, 335, 390

[56] References Cited

U.S. PATENT DOCUMENTS

| | | | |
|---|---|---|---|
| 2,864,477 | 12/1958 | Hollyday | 192/71 |
| 3,980,977 | 9/1976 | Evans | 310/105 |
| 4,190,755 | 2/1980 | Rogers | 200/334 |
| 4,351,994 | 9/1982 | Evans | 200/400 |
| 4,444,067 | 4/1984 | Preuss | 335/68 |
| 4,724,512 | 2/1988 | Bischof | 361/357 |
| 4,803,587 | 2/1989 | Fournier | 200/50 C |
| 4,804,809 | 2/1989 | Thompson, Jr. | 200/17 R |
| 4,827,089 | 5/1989 | Morris | 200/50 C |

OTHER PUBLICATIONS

S&C Electric Company Descriptive Bulletin 663-30 dated Apr. 3, 1989 (20 pp.).
A. B. Chance Bulletin No. 17-8803-US, dated 70-88 (4 pp.) (Jul. 1988).

*Primary Examiner*—Gerald P. Tolin
*Attorney, Agent, or Firm*—James V. Lapacek

[57] ABSTRACT

A method and arrangement are provided for power operation of manually operable switchgear. The capability for power operation may be provided either during manufacture or as a retrofit to installed switchgear. The apparatus includes a switch-operator unit which is attached to the switchgear. In a preferred embodiment, the apparatus includes a device for providing power to a rechargeable power supply of the switch-operator unit from the energized portions of the switchgear; the power-providing device being efficiently installed in either a field retrofit operation to installed switchgear or during manufacture of the switchgear. The apparatus also includes provisions for providing operating power from the rechargeable power supply of the switch operator to a second, separately housed switch-operator unit that is attached to the switchgear.

14 Claims, 5 Drawing Sheets

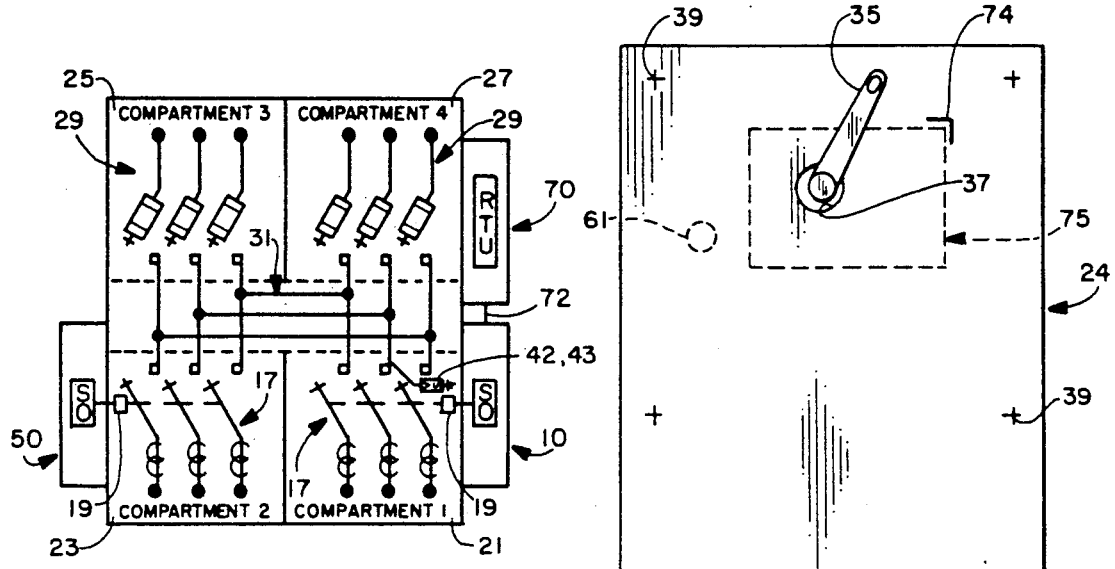
FIG. 4
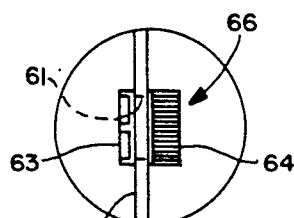
FIG. 6A
FIG. 5
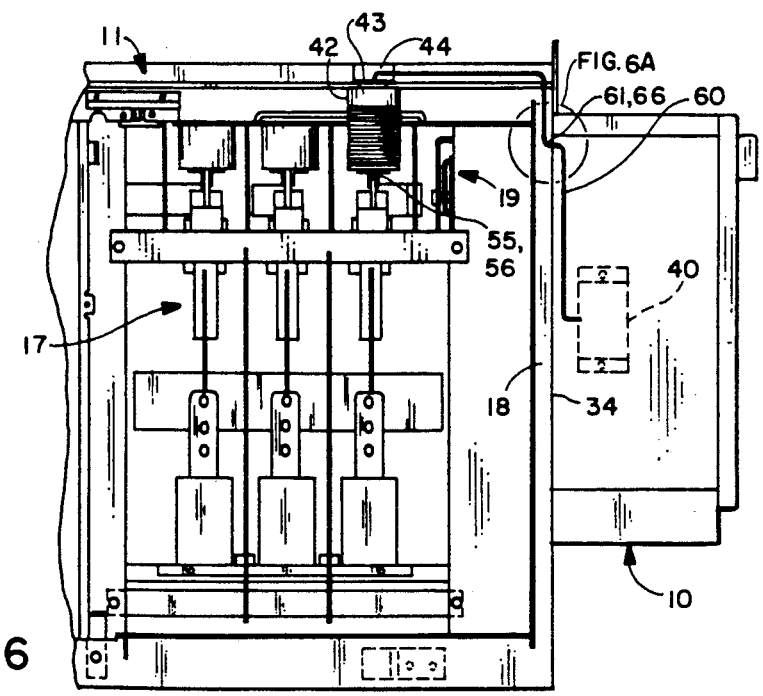
FIG. 6

METHOD AND ARRANGEMENT FOR PROVIDING POWER OPERATION OF SWITCHGEAR APPARATUS

CROSS REFERENCE TO RELATION APPLICATION

The switch operator of copending application Ser. No. 07/411,425 filed in the names of T. Fanta et al on Sept. 22, 1989, is hereby incorporated by reference herein for all purposes and is utilized herein to illustrate the method and arrangement of the present invention.

BACKGROUND OF THE INVENTION

1. Field of the Invention

The present invention relates generally to power-operated switchgear apparatus and more particularly to a method and arrangement for providing the capability of power operation of switchgear apparatus via installation either during manufacture of the switchgear or as a retrofit to installed switchgear apparatus.

2. Description of the Related Art

Various types of switchgear apparatus include manually operable switches; e.g., manually operable pad-mounted gear available from S&C Electric Company, Chicago, Ill. Power-operated pad-mounted switchgear is also available from the same source and includes an integrally incorporated switch operator and a voltage sensor that is incorporated within a switch-support structure to provide operating power. S&C Electric Company Descriptive Bulletin 663-30 (Apr. 13, 1989) at page 18 illustrates a voltage sensor that is incorporated within the switchgear during manufacture. The voltage sensor is provided with a terminal pad and a support bracket for the hinge end of the switch. A typical switch-operating mechanism is illustrated in more detail in U.S. Pat. No. 4,351,994.

The arrangement of U.S. Pat. No. 4,804,809 is directed to a motor operator that can be installed on an exterior side of a switchgear cabinet during manufacture or as a retrofit to installed switchgear. The motor operator may be activated locally by a pushbutton switch mounted inside a housing enclosing the operator, or optionally may be controlled from a remote location. Local or remote indicators may also be provided for indicating whether the contacts of the switchgear are open or closed. This arrangement, as further described in A. B. Chance Bulletin No. 17-8803-US (1988) may include a battery pack but still requires connection to an external power source.

While the aforementioned arrangements may be generally suitable for various applications, they do not provide an efficient arrangement for manually operable switchgear that can be installed during manufacture of switchgear or as a retrofit to installed switchgear apparatus without the requirement of connections to external power sources to accomplish power operation of the switchgear while also providing for additional features via future expansion.

SUMMARY OF THE INVENTION

Accordingly, it is a principal object of the present invention to provide method and apparatus for the capability of self-contained power operation of switchgear without connection to external power sources; the capability being provided either by field retrofit to installed switchgear or during manufacture of the switchgear.

It is another object of the present invention to provide self-contained power operation of two or more switches of manually operable switchgear via a field retrofit kit including two or more switch operators wherein each switch operator is independently housed and one power supply arrangement is provided to operate the two or more switch operators.

It is a further object of the present invention to provide a field retrofit kit of component parts to efficiently convert manually operable switchgear to self-contained power operation without connection to external power sources.

These and other objects of the present invention are efficiently achieved by the provision of method and apparatus for power operation of manually operable switchgear. The capability for power operation may be provided either during manufacture or as a retrofit to installed switchgear. The apparatus includes a switch-operator unit which is attached to the switchgear. In a preferred embodiment, the apparatus includes a device for providing power to a rechargeable power supply of the switch-operator unit from the energized portions of the switchgear; the power-providing device being efficiently installed in either a field retrofit operation to installed switchgear or during manufacture of the switchgear. The apparatus also includes provisions for providing operating power from the rechargeable power supply of the switch operator to a second, separately housed switch-operator unit that is attached to the switchgear.

BRIEF DESCRIPTION OF THE DRAWING

The invention, both as to its organization and method of operation, together with further objects and advantages thereof, will best be understood by reference to the following specification taken in conjunction with the accompanying drawing in which like reference characters refer to like elements and in which:

FIG. 4 is a schematic and pictorial representation of the manually operable switchgear of FIG. 1 incorporating provisions of the present invention;

FIG. 5 is a diagrammatic elevation useful in illustrating the installation of the switch operator on a field retrofit basis;

FIG. 6 is a front elevational view of the apparatus of FIG. 1 illustrating provisions of the present invention;

FIG. 6A is an enlarged view of the portion indicated in FIG. 6 by the reference FIG. 6A;

DETAILED DESCRIPTION

Figure 1:
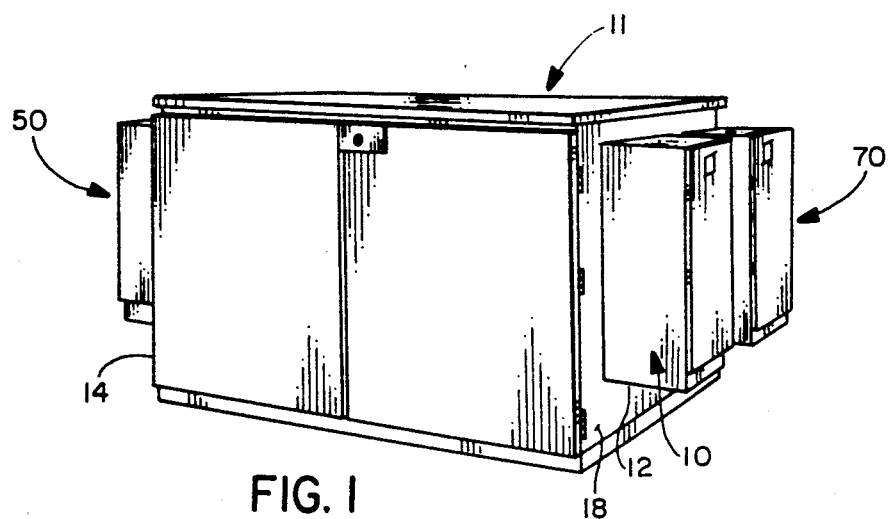
FIG. 1 is a perspective view of manually operable switchgear including the provisions of the present invention to provide power operation thereof.
Figure 2:
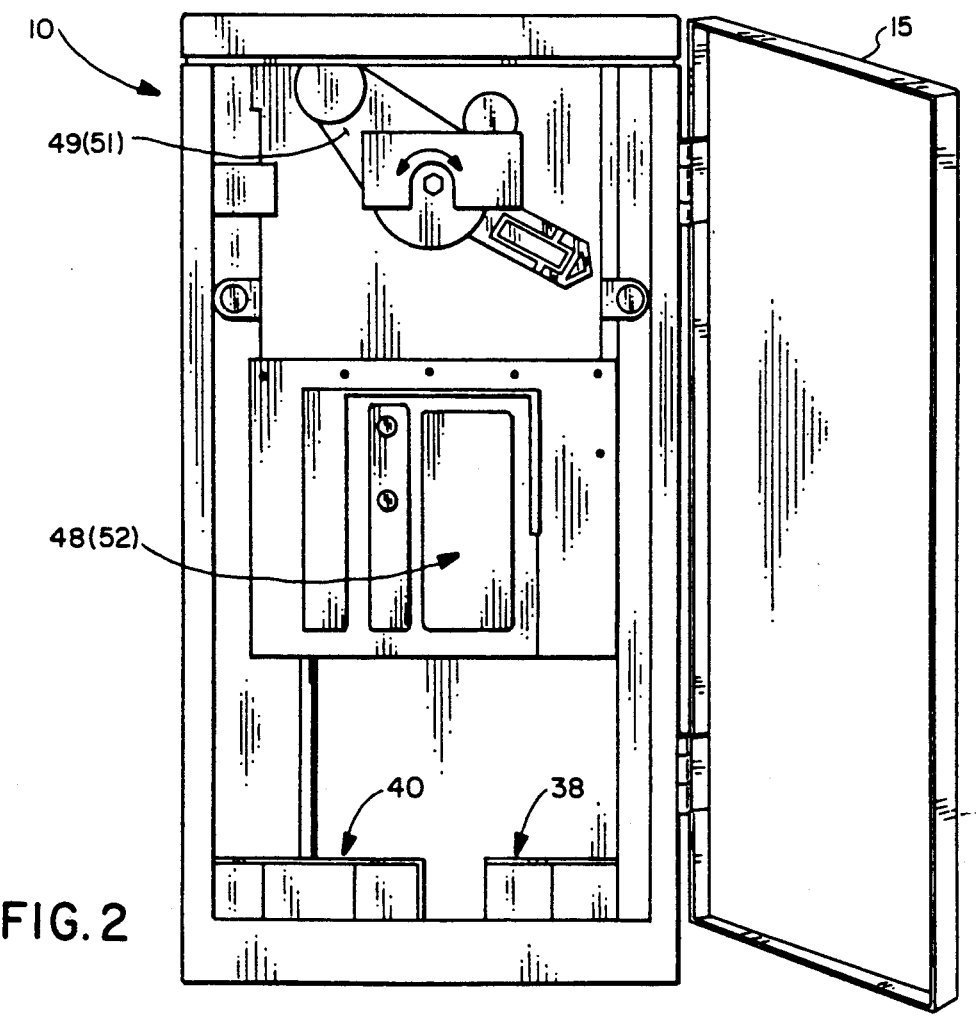
FIG. 2 is a front elevational view of the switch operator of the present invention of FIG. 1 with an access door in an open position.
Figure 3:
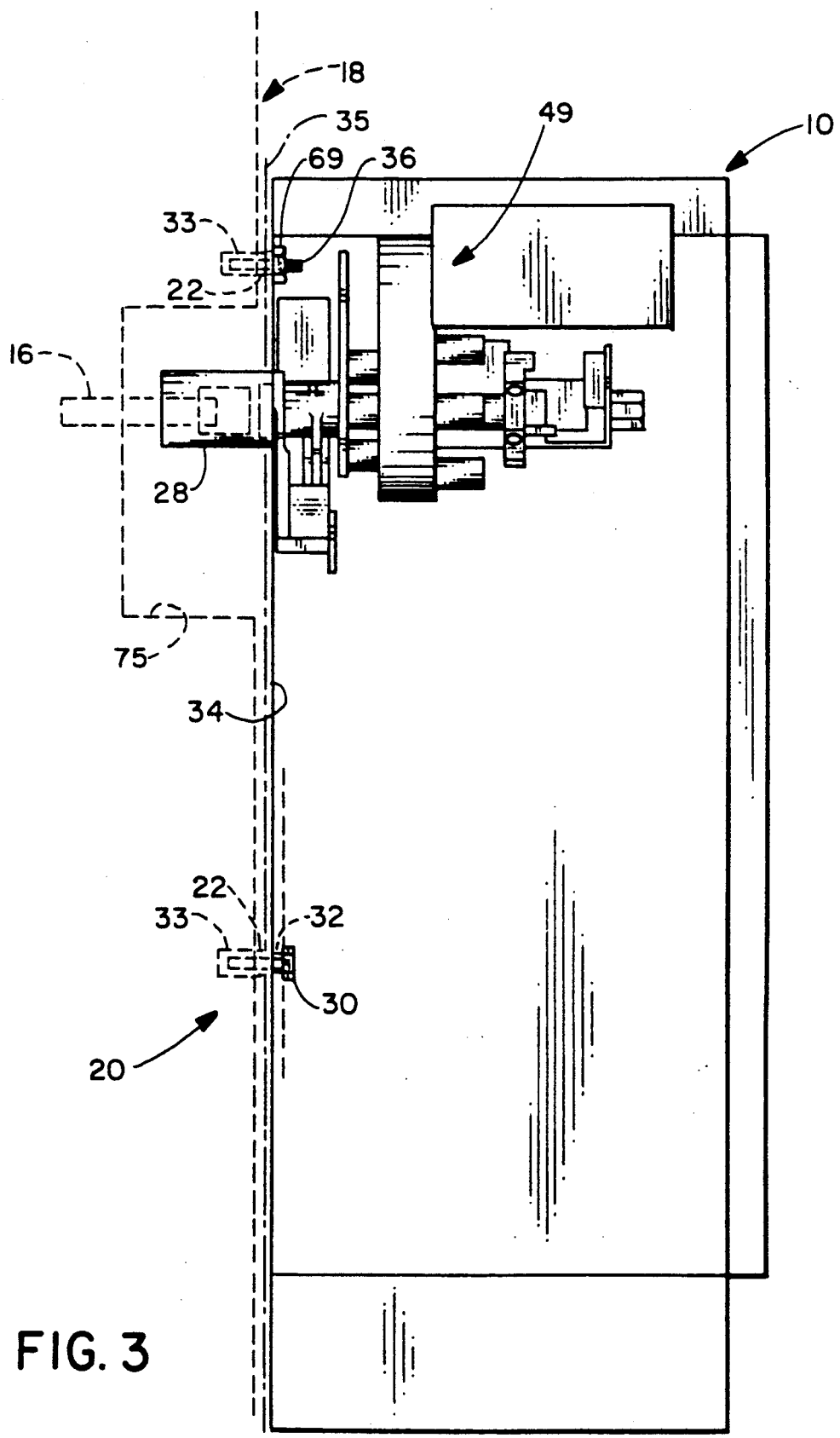
FIG. 3 is a side elevational view of the switch operator of FIG. 2 with parts cut away for clarity.

Referring now to FIGS. 1, 2 and 3, the method and apparatus of the present invention is useful to provide power operation of manually operable switchgear 11 via the attachment of a switch-operator unit 10 to the exterior of the enclosure 14 of the switchgear 11. Referring now additionally to FIG. 2, the switch-operator unit 10 includes an enclosure 12 that is provided with an access door 15 shown in an open position; the components of the switch-operator unit 10 and their function to practice the present invention being discussed in more detail hereinafter. Referring now to FIG. 3, the switch-operator unit 10 is arranged to rotate an operating shaft 16 that extends through the side wall 18 of the enclosure 14 of the switchgear 11. The enclosure 12 is affixed to the switchgear 11 either during manufacture or during a retrofit to installed switchgear 11.

Referring now additionally to FIG. 4, in an exemplary configuration, the switchgear 11 includes four compartments 21, 23, 25 and 27. Each of the compartments 21 and 23 houses a three-pole group-operable switch 17 which is operable via a respective operating mechanism 19. Additionally, each of the compartments 25 and 27 houses a three-phase assembly of fuses, generally referred to at 29. Appropriate buses, generally referred to at 31, interconnect the respective phases/poles of the fuses 29 and the switchgear 17. Reference may be made to U.S. Pat. No. 3,980,977 for a more detailed description of manually operable switchgear of this general type including an exemplary operating mechanism that includes an operating shaft (80 in FIG. 3A of the '977 patent) that extends through the side wall of the switchgear enclosure.

In a preferred embodiment and referring now additionally to FIG. 3, the enclosure 12 is affixed to the switchgear 11 via fastening devices 20, for example, each of which include an expandable anchor 33 which is inserted through a hole 22 in the enclosure side wall 18 of the switchgear 11 and affixed for the appropriate expansion thereof. Preferably, and referring now additionally to FIG. 5, a template 24 is positioned over a manual operating handle 35 or other extension of the operating shaft 16 to locate the mounting holes; e.g., the template 24 includes an opening 37 for placement about the shaft 16 and a hole locator 39 for location of the holes 22. The template 24, preferably of transparent material, also includes indicia or reference markings 74 that are aligned with one or more corners or edges of a predetermined reference feature of the switchgear 11 such as the pocket 75. In alternative embodiments, where the template 24 is not transparent, the area corresponding to the reference markings or predetermined areas of the pocket 75 are punched out of the template 24 to provide appropriate openings. In a specific embodiment, the template 24 is either taped or provided with a weak adhesive for the temporary affixing of the template 24 to the side wall 18 during the marking and/or drilling of the holes 22. The locations are marked via center punch or the like and the template 24 is removed. The holes 22 are then drilled along with possible additional holes such as a hole 26 for the routing of control wiring. The enclosure 12 is then mounted to the switchgear 11 via a sleeve 28 that is placed around the operating shaft 16 and by the assembly of bolts 30 through the holes 32 in a rear wall 34 of the enclosure 12 and into the anchors 33. Also in a specific embodiment, studs 36 are provided for the two upper fasteners for supporting the enclosure 12 during mounting—nuts 69 being placed over the studs 36 or the studs 36 being replaced by bolts 30 later during assembly. Preferably, gasket 35 is affixed around the perimeter of the rear wall 34 of the enclosure 12 to provide appropriate sealing to the environment when the switch-operator unit 10 is attached to the switchgear 11.

Figure 7:
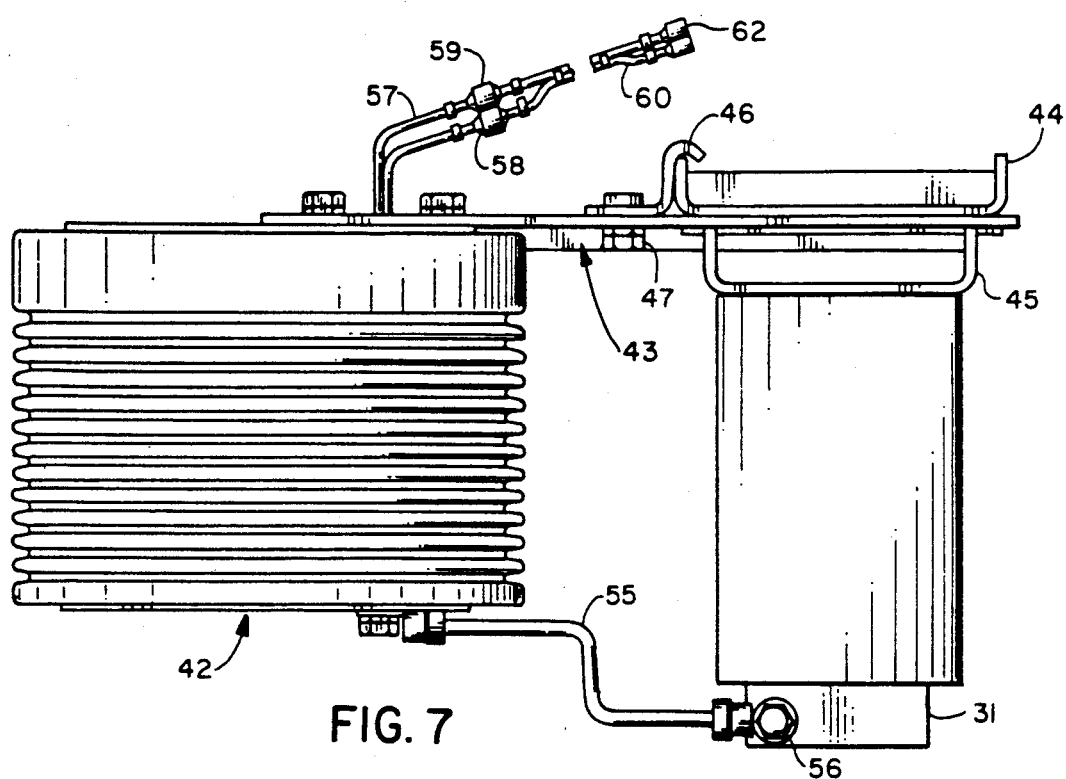
FIG. 7 is a side elevational view of portions of FIG. 6.

As shown in FIG. 2, preferably the switch-operator unit 10 includes a battery 38 and a charger/regulator 40. In a preferred embodiment, and referring additionally to FIGS. 6 and 7, a supply of operating/charging power to the power supply is provided via a voltage sensor 42. The voltage sensor 42 is mounted within the switchgear 11 via a mounting bracket 43 affixed to a support member 44 of the switchgear 11. Specifically, the bracket 43 with attached voltage sensor 42 is positioned between the support member 44 and an upper support member 45 of the switch 17. During the placement of the bracket 43, a retainer clamp 46 carried by the mounting bracket 43 is positioned over the upstanding edge of the support member 44. Fasteners 47, which affix the retainer clamp 46 to the bracket 43, are sufficiently loose to permit the appropriate positioning of the bracket 43, whereupon the fasteners 47 are then tightened for completion of the installation. A primary conductor 55 of the voltage sensor 42 includes a clamp connector 56 which is affixed to the bus 31 of the switchgear 11. The voltage sensor 42 also includes output conductors 57 having connectors 58 which mate with connectors 59 on a conductor cable 60. The conductor cable 60 is routed within the support member 44 and down through a hole 61 in the side wall 18 and into the enclosure 12 of the switch operator unit 10. Connectors 62 on the conductor cable 60 are connected to the charger/regulator 40. As shown in FIG. 6A, interfitting portions 63,64 of an insulating bushing 66 are assembled about the side wall 18. When the bus 31 is energized, operating power at approximately 120 vac is supplied to the charger/regulator 40.

The switch-operator unit 10 includes a controller 48 which carries open-close pushbuttons for local switch operation and which also provide appropriate circuitry and logic for controlling operation of the motor/geartrain 49 from either local commands or remote control signals. The controller 48 is supplied with operating power from the battery 38.

When the switchgear 11 includes more than one switch 17 as shown in FIG. 5 (e.g., more than one three-pole switch) and it is desired to provide power operation to a second switch, a second switch operator 50 is provided adjacent the second switch 17 as illustrated in compartment 23. The second switch operator 50 may be referred to as a companion operator, while the first switch operator unit 10 may be referred to as a master operator. The second switch operator 50 includes a motor/gear-train 51 and a controller 52. No charger/regulator or battery is required in the second switch operator 50 as power is supplied to the second switch operator 50 from the switch operator unit 10 via an interconnection cable 54. Accordingly, the switch operator 50 includes the open/close pushbuttons for local operation, the manual operation via the manual operating handle, and the decoupling features.

Figure 8:
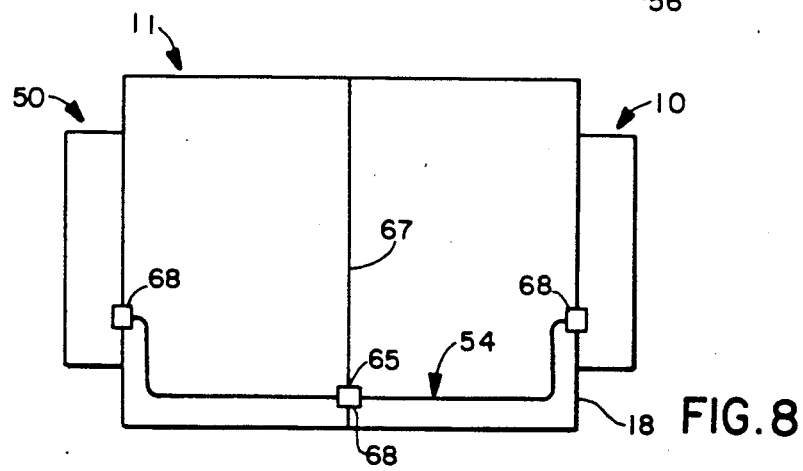
FIGS. 8 and 9 are front and plan diagrammatic views of the arrangement of FIG. 1 illustrating the interconnection of portions of the present invention.
Figure 9:
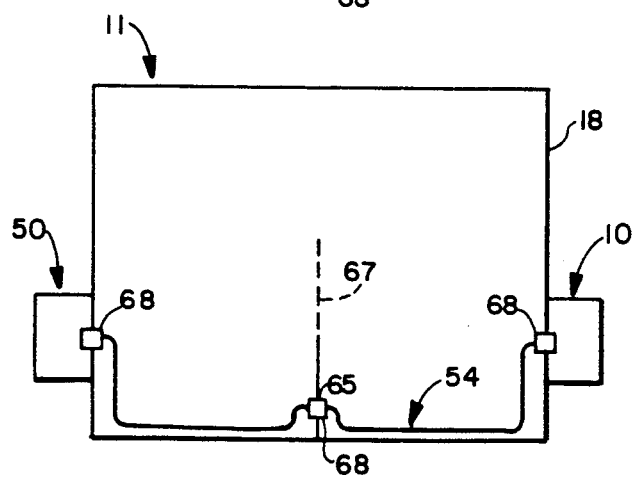
Figure 10:
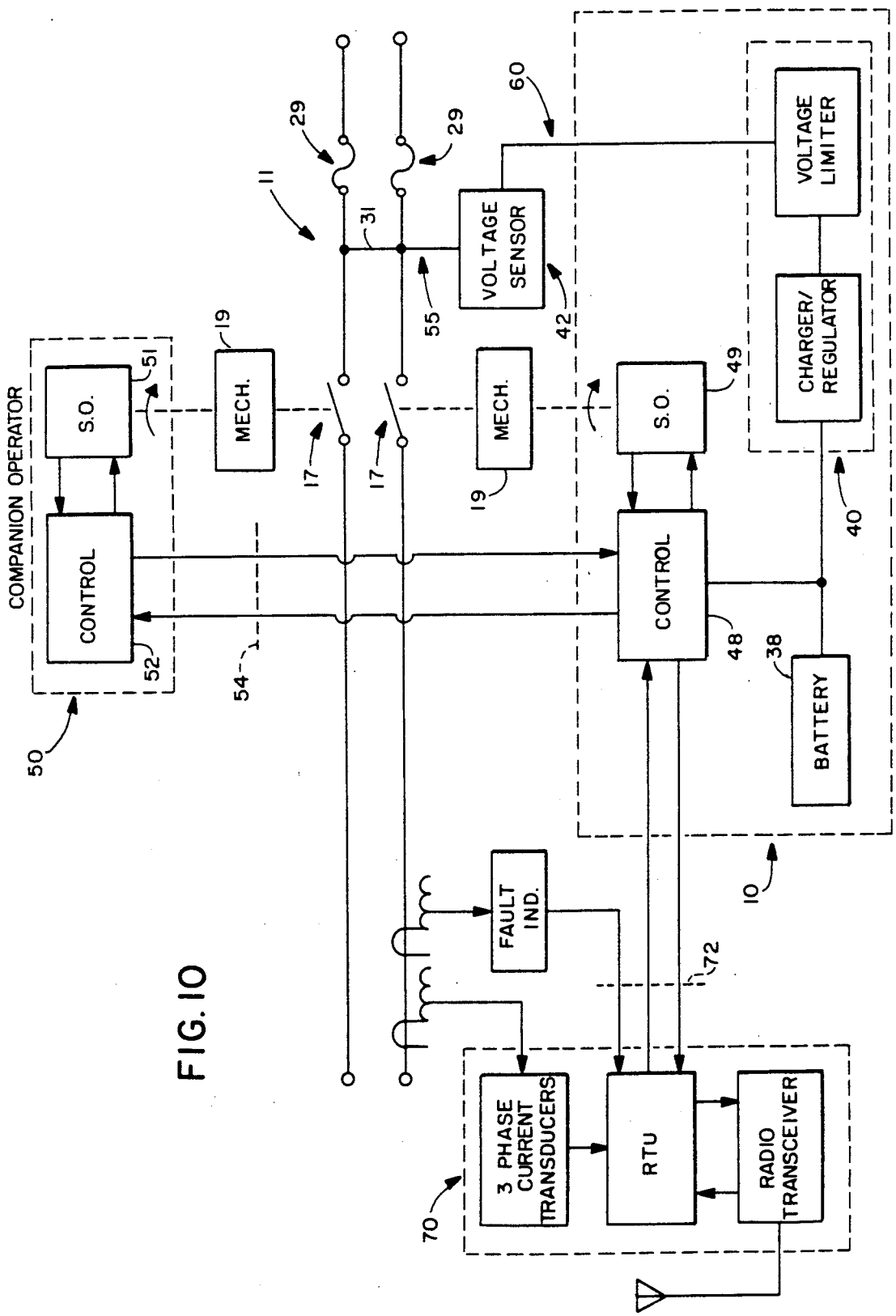
FIG. 10 is a schematic and block diagram representation of the arrangement of FIGS. 1–9 illustrating additional aspects of the present invention—the three-phase portions of the arrangement being illustrated on a one-line basis.

The interconnection cable 54 includes multiple conductors for the interconnection of the operating power and additionally for control signals for the second switch operator 50. The control signals are routed to the switch operator 50 via the first switch-operator unit 10 and the interconnection cable 54. The interconnection cable 54 is routed as shown in FIGS. 8, 9, and 10 from the switch-operator unit 10 and through compartments 1 and 2 to the switch operator 50 via suitable holes 65 and the hole 26. Bushings 68, similar to the bushing 66, are provided through the side wall such as 18 and the central wall 67 to prevent chafing the cable 54. The routing as shown in FIGS. 8 and 9 is accomplished to maintain the interconnection cable 54 at appropriate distances from energized components.

In accordance with a specific embodiment and other features of the present invention, another enclosure 70 is affixed to the enclosure of the switchgear for the housing of communications apparatus, such as a remote terminal unit (RTU), transducers, etc. Operating power is supplied to the equipment housed within the enclosure 70 by the switch-operator unit 10 over a multi-conductor cable 72. Additionally, the multi-conductor cable 72 also includes conductors for communication and control signals that are passed between the RTU equipment or the like and the switch operators 10 and 50. Thus, remote supervisory control of the switchgear 11 is provided for automated distribution systems. Reference may be made to FIG. 10 for the overall circuit connections provided by the method and apparatus of the present invention.

While there have been illustrated and described various embodiments of the present invention, it will be apparent that various changes and modifications will occur to those skilled in the art. For example, in specific embodiments, additional second switch operators 50 are provided for respective additional switches 17 which are located, for example, in compartments 25 and/or 27 in lieu of the fuses 29; the additional second switch operators 50 being connected to the first switch-operator unit 10 via interconnection cables 54. It is intended in the appended claims to cover all such changes and modifications as fall within the true spirit and scope of the present invention.

What is claimed and desired to be secured by Letters Patent of the United States is:

1. A kit of component parts capable of being assembled with either an existing, installed switchgear arrangement or during manufacture of the switchgear arrangement to provide power operation of the switchgear, the switchgear including energizable input connections, an enclosure having predetermined components, one or more switches, each of the switches having a respective switch-operating shaft that extends through the enclosure, the switch-operating shaft being rotatable to operate a respective switch, the kit comprising:

first switch-operator means including a switch-operator enclosure, rechargeable power supply means, and drive output means defining a drive output for coupling to the switch-operating shaft;

means for attaching said first switch-operator means to the switchgear enclosure in a predetermined configuration about the switch-operating shaft;

power-deriving means adapted to be attached to a predetermined component of the switchgear apparatus and including an input for connection to energized portions of the switchgear for providing at a predetermined output power that is derived from the energized switchgear; and means for connecting the output of said power-deriving means to said first switch-operator means.

2. The kit of claim 1 wherein said power-deriving means includes means for clamping said power-deriving means to the predetermined component.

3. The kit of claim 1 wherein said switch-operator enclosure includes a rear wall defining a predetermined pattern of holes.

4. The kit of claim 3 wherein said attaching means comprises a plurality of first fastening devices for attachment to the switchgear enclosure in said predetermined pattern and a plurality of second fastening devices that are positioned through said holes for cooperation with said first fastening devices.

5. The kit of claim 3 further comprising a template including means for aligning said template with respect to a first switch-operating shaft and locating predetermined points on the enclosure of the switchgear corresponding to said predetermined pattern of holes.

6. The kit of claim 5 wherein said switch-operator enclosure includes a door movable to provide access to the interior of said switch-operator enclosure.

7. The kit of claim 1 wherein said first switch-operator means further includes charger/regulator means responsive to said output of said power-deriving means, said rechargeable power supply means including energy-storage means responsive to said charger/regulator means.

8. The kit of claim 7 wherein said first switch-operator means further includes motor/gear-train means responsive to said energy storage means for actuating said drive output means.

9. The kit of claim 1 further comprising second switch-operator means for attachment to another portion of the switchgear enclosure and including a drive output coupled to a second switch-operating shaft and means for transmitting electrical signals between said first and second switch-operator means.

10. The kit of claim 9 wherein said electrical-signal-transmitting means comprises a cable having multiple conductors and being adapted to be disposed through said switchgear enclosure and means for connecting said multiple conductors to predetermined respective points of said first and second switch-operator means.

11. The kit of claim 9 wherein said electrical-signal-transmitting means includes means for transmitting operating power from said first switch-operator means to said second switch-operator means.

12. The kit of claim 10 wherein one or more of said multiple conductors are connected to provide operating power to said second switch-operator means from said first switch-operator means.

13. The kit of claim 12 wherein one or more of said multiple conductors are arranged to provide control signals to said second switch-operator means to control rotation of the respective switch-operating shaft.

14. The kit of claim 13 wherein one or more of said multiple conductors are connected to provide information about the position of the respective switch-operating shaft coupled to said second switch-operator means.

* * * * *